United States Patent [19] [11] 4,264,427
Stahl [45] Apr. 28, 1981

[54] APPARATUS FOR DEVELOPING ELECTROSTATICALLY CHARGED SHEET-LIKE CARRIERS OF LATENT IMAGES

[75] Inventor: Werner Stahl, Heimstetten, Fed. Rep. of Germany

[73] Assignee: AGFA-Gevaert, A.G., Leverkusen, Fed. Rep. of Germany

[21] Appl. No.: 88,472

[22] Filed: Oct. 26, 1979

[30] Foreign Application Priority Data

Oct. 31, 1978 [DE] Fed. Rep. of Germany ....... 2847315

[51] Int. Cl.³ ........................ B01D 13/02; B01D 13/16
[52] U.S. Cl. ................................................ 204/300 EC
[58] Field of Search .................. 204/300 PE, 300 EC; 118/647, 662; 430/119

[56] References Cited

U.S. PATENT DOCUMENTS 2,440,504 4/1948 Fisher et al. .................. 204/300 EC
4,168,329 9/1979 Miyakawa et al. .................. 118/662

*Primary Examiner*—Howard S. Williams
*Attorney, Agent, or Firm*—Peter K. Kontler

[57] ABSTRACT

Latent images on sheet-like carriers are developd by attracting that side of a carrier which faces away from the image to the convex external surface of a first support which constitutes a portion of or an entire hollow drum and is rotatable in at least one direction. A concavo-convex electrode is outwardly adjacent to and spaced apart from the path of movement of the carrier on the first support and can be mounted directly on the first support or on a discrete second support which is coaxial with and can be rotated with as well as relative to the first support. The electrode and the carrier define an arcuate developing chamber of constant width which receives a supply of developing liquid when the one and/or the other support is rotated to place the carrier into register with the electrode or to simultaneously rotate the carrier and the electrode to a position in which the developing liquid can flow downwardly and into the developing chamber. The development of the image on the carrier is terminated by rotating the one and/or the other support in the same direction in which the support or supports are rotated to contact the carrier by the developing agent. This insures that the developing agent contacts each and every portion of the image for the same interval of time.

12 Claims, 10 Drawing Figures

Fig. 2a
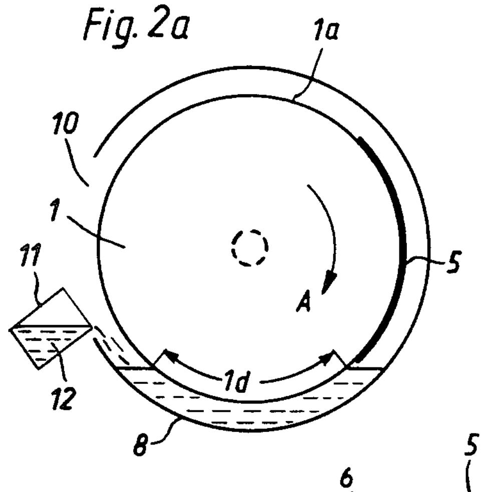
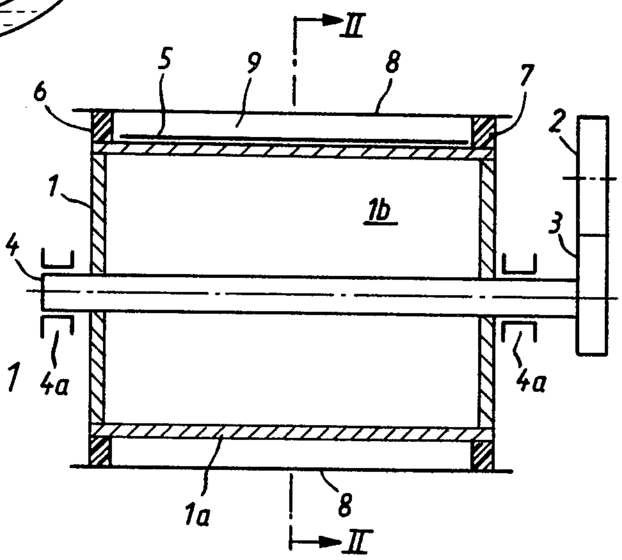
Fig. 1
Fig. 2b
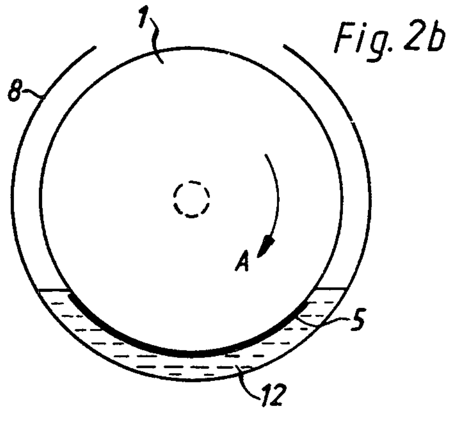
Fig. 2c
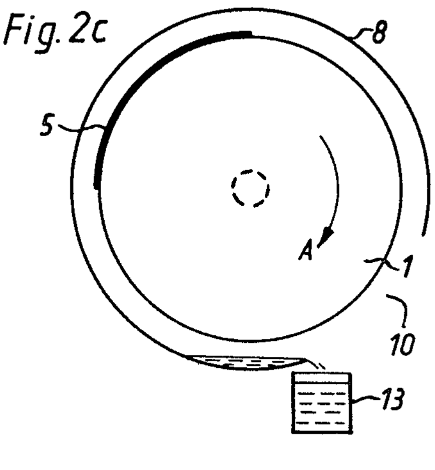

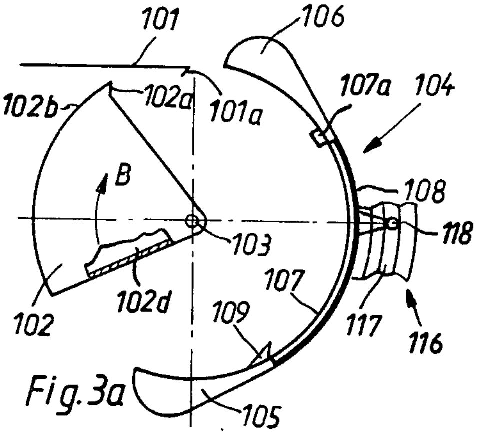
Fig. 3a
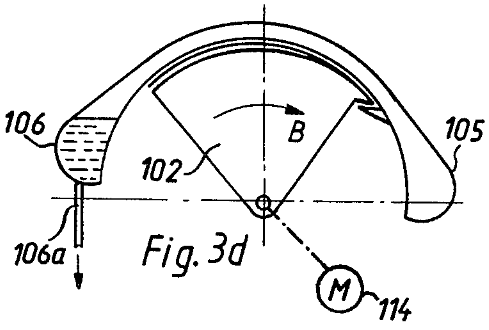
Fig. 3d
Fig. 3b
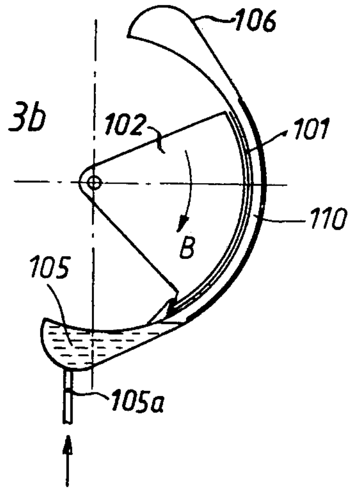
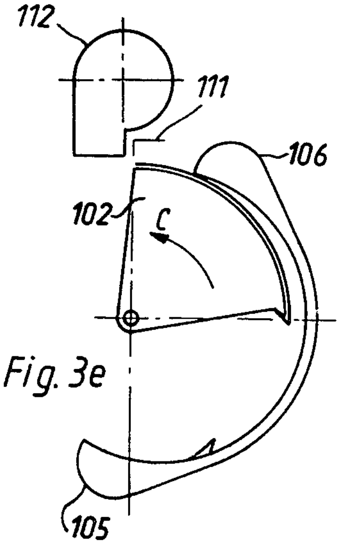
Fig. 3e
Fig. 3c
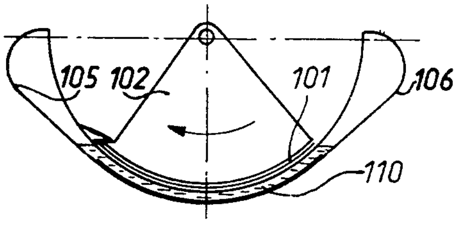
Fig. 3f
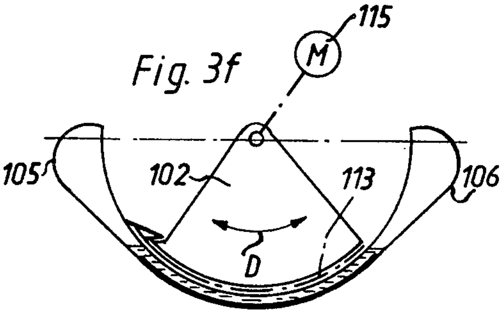

APPARATUS FOR DEVELOPING ELECTROSTATICALLY CHARGED SHEET-LIKE CARRIERS OF LATENT IMAGES

BACKGROUND OF THE INVENTION

The present invention relates to apparatus for electrophoretically developing latent images on electrostatically charged sheet-like carriers, especially on carriers which were exposed to X-rays, by contacting the latent images with a liquid developing agent which contains toner particles and is caused to act upon the images for a given interval of time.

It is well known that the quality of developed images on electrostatically charged sheet-like carriers is improved if the toner particles are applied by causing a liquid which contains toner particles to flow past the image at a constant rate and especially if the body of liquid forms a laminar flow. Since the deposition of toner particles on the latent image proceeds more rapidly immediately after initial contact between the image and the liquid developing agent (the rate of deposition of toner particles takes place in accordance with the e-function), any turbulence during such phase of a developing operation is likely to adversely influence the quality of the developed image. The quality of developed images can be reduced by streaking, Schlieren effect, variations in density and/or a combination of such defects. The just outlined defects are especially likely to arise if the developing operation does not result in full compensation of the charge which has been applied to the sheet-like carrier.

OBJECTS AND SUMMARY OF THE INVENTION

An object of the invention is to provide a novel and improved apparatus for developing electrostatically charged sheet-like carriers of latent images, especially of images which are obtained by exposure of synthetic plastic foils to X-rays.

Another object of the invention is to provide a novel and improved apparatus for contacting the latent image on an electrostatically charged sheet-like carrier with a liquid developing agent which contains toner particles.

A further object of the invention is to provide an apparatus which reduces the likelihood of or eliminates turbulence in developing agent, at least during the initial stage of contact between such agent and the latent image on a sheet-like carrier.

An additional object of the invention is to provide an apparatus which insures that the developed images are free of Schlieren effect, streaks, density variations and/or of a combination of two or more of these defects.

A further object of the invention is to provide an apparatus which can be used for rapid and highly satisfactory development of latent images on electrostatically charged sheet-like carriers in a small area, by utilizing small quantities of liquid developing agent, by allowing for collection of spent developing agent, and by allowing for rapid and thorough cleaning of the apparatus after each developing operation.

One feature of the invention resides in the provision of an apparatus for electrophoretically developing electrostatically charged sheet-like members which constitute carriers of latent images, especially radiographic images, by contact with a liquid developing agent for a given interval of time. The apparatus comprises means for imparting to a sheet-like member a concavo-convex configuration so that the latent image is located at one side of the sheet-like member (for example, the sheet-like member can be caused to adhere by suction to the external surface of a rotary drum-shaped support or a portion of a drum-shaped support so that the exposed convex side of the sheet-like member carries the latent image), means for rotatably mounting the thus deformed sheet-like member for movement along a substantially cylindrical path about the center of curvature of the sheet-like member (such path can be defined by the shell of the aforementioned drum-shaped support or by the convex external surface of a support which constitutes a portion of a hollow cylindrical drum), means for rotatably mounting a concavo-convex electrode member adjacent to a portion of the cylindrical path so that the sheet-like member and the adjacent side of the electrode member define a developing chamber of substantially constant width (as considered radially of the cylindrical path) when the two members are located opposite each other, means for introducing into the developing chamber a supply of liquid developing agent which contains toner particles, means for rotating at least one of the two members in a predetermined direction to thereby place the image on the sheet-like member into contact with the liquid developing agent in the developing chamber, and means for interrupting such contact including means for rotating at least one of the two members in the aforementioned direction. Such rotation of the one and/or other member in the same direction during movement of the image into contact with the liquid developing agent (and/or vice versa) as well as during termination of contact between the developing agent and the image insures that each and every portion of the image is contacted by liquid developinhg agent for the same interval of time. This is even more certain if the speed at which the image is moved into contact with the developing agent (and/or vice versa) matches the speed at which the developed image is moved out of contact with the developing agent (and/or vice versa).

In accordance with a presently preferred embodiment of the invention, the one side of the sheet-like concavo-convex member is the convex side of such member. Also, the introducing means can be operated simultaneously with the means for rotating at least one of the two members to place the image on the sheet-like member into contact with liquid developing agent which is confined in the developing chamber.

The apparatus can further comprise means for establishing first and second storage areas for the developing agent upstream and downstream of and in communication with the developing chamber, as considered in the aforementioned direction, and means for admitting the developing agent into the second storage area while maintaining the second storage area at a level below the first storage area and below the developing chamber. The introducing step then takes place as a result of rotating of the two members in the aforementioned direction whereby the developing agent flows from the second storage area into the developing chamber. Thus, the introducing means then rotates the two members in the aforementioned direction so as to move the developing chamber to a level below the first and second storage areas. The interrupting means then includes means for moving the first storage area to a level below the developing chamber and below the second storage area so that the developing agent is free to flow from the developing chamber into the first storage area. Each storage area can be defined by a compartment which is adjacent to the respective side of the developing chamber in a substantially semicylindrical support for the electrode member.

The apparatus can further include one or more means for treating the sheet-like member upon completion of the developing step. Such additional means can include means for drying the sheet-like member with a hot gaseous fluid (e.g., air) and/or means for moving the sheet-like member past a corona discharge device which determines the thickness of the isododecanic layer.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of an apparatus which embodies one form of the invention and wherein the electrode member shares all angular movements of the sheet-like carrier member;

FIG. *2a* is a schematic transverse sectional view as seen in the direction of arrows from the line II—II of FIG. 1 and shows the sheet-like member and the electrode member in their starting positions prior to commencement of the developing step;

FIG. *2b* illustrates the structure of FIG. *2a* with the two members in angular positions they assume during development of latent image on the sheet-like member;

FIG. *2c* illustrates the structure of FIG. *2a*, with the two members in positions they assume during evacuation of liquid developing agent from the developing chamber;

FIG. *3a* is a schematic end elevational view of a modified apparatus wherein the sheet-like member and the electrode member are rotatable with and relative to each other, the two members being shown in starting positions prior to commencement of development of a latent image on the sheet-like member;

FIG. *3b* illustrates the structure of FIG. *3a* with the two members and their supports in positions they assume during admission of developing agent into one of the storage areas;

FIG. *3c* illustrates the structure of FIG. *3a*, with the two members and their supports in the positions they assume during development of latent image on the sheet-like member;

FIG. *3d* illustrates the structure of FIG. *3a* with the sheet-like members and their supports in positions they assume during evacuation of spent developing agent from the other storage area;

FIG. *3e* illustrates the structure of FIG. *3a* with the members and their supports in positions they assume during aftertreatment of a fully developed image on the sheet-like member; and FIG. *3f* illustrates the structure of FIG. *3a* with the two members and their supports in positions they assume during rinsing of the interior of the support for the electrode member.

DESCRIPTION OF THE PREFERRED EMBODIMENTS

FIG. 1 shows a hollow drum-shaped rotary support 1 for sheet-like carrier members 5 of latent images. The shaft 4 of the support 1 is mounted in bearings 4*a* and can be driven by gears 2 and 3 receiving torque from a suitable prime mover, not shown. The cylindrical shell 1*a* of the support 1 is formed with suction ports (not specifically shown), and the internal space 1*b* of the support 1 constitutes, at least at times, a suction chamber so that a sheet-like electrostatically charged carrier member 5 (hereinafter called sheet for short) can be attracted to the external surface of the shell 1*a* during transport toward, through and beyond the developing station. The direction in which the gears 2 and 3 can rotate the drum-shaped support 1 is indicated by the arrow A as seen in the sectional views of FIG. 1. The end portions of the shell 1*a* are surrounded by distancing rings 6 and 7 which consist of electrically insulating material and are, in turn, surrounded by a substantially cylindrical (concavo-convex) electrode member 8 which is made of relatively thin sheet metal. The chamber 9 between the convex external surface of the shell 1*a* and the concave internal surface of the electrode member or electrode 8 is of constant width, as considered in the radial direction of the support 1; this chamber serves for development of latent images at the convex outer sides of sheets 5 on the sleeve 1*a*. For example, the outer diameter of the sleeve 1*a* can equal or approximate 250 millimeters, and the width of the developing chamber 9 may be in the range of 10 millimeters.

As shown in FIGS. *2a*, *2b* and *2c*, the electrode 8 is a slotted hollow cylinder and its slot 10 constitutes an aperture which serves for admission as well as for evacuation of a liquid developing agent 12. The electrode 8 is detachable from the support 1 (e.g., by moving the electrode in the axial direction of the shell 1*a*) so that an electrostatically charged sheet 5 can be readily placed against the external surface of the sleeve 1*a* in such position (see FIGS. *2a–2c*) that its image-bearing convex outer side is located diametrically opposite the aperture 10 when the electrode 8 is returned to the operative position in which it surrounds the distancing rings 6, 7 and defines with the sleeve 1*a* the aforementioned developing chamber 9. The sheet 5 readily adheres to the external surface of the sleeve 1*a* because the space 1*b* is then connected to the intake of a fan or another suitable suction generating device, not shown. The connection between the chamber or space 1*b* and the suction generating device can extend through the shaft 4.

FIG. *2a* shows the apparatus prior to start of a developing operation. The center of the sheet 5 is located at the three o'clock position, and the center of the aperture 10 is located at the nine o'clock position (or vice versa). A first vessel 11 is thereupon caused to admit liquid developing agent 12 into the lower portion of the chamber 9. The quantity of liquid developing agent in the chamber 9 is selected in such a way that the length of that portion (1*d*) of the external surface of the sleeve 1*a* (as considered in the circumferential direction of the support 1) which is contacted by liquid at least equals or at least slightly exceeds the corresponding dimension of the sheet 5. Otherwise stated, and as shown in FIG. *2b*, the quantity of liquid developing agent 12 in the chamber 9 suffices to insure that the entire sheet 5 can be immersed in the developing agent in response to appropriate rotation of the support 1 in the direction indicated by arrow A.

When the vessel 11 has completed the admission of a requisite quantity of liquid developing agent 12 (hereinafter called liquid for short) into the developing chamber 9, the gears 2 and 3 are caused to rotate the shaft 4 clockwise through 90 degrees so that the mobile parts assume the positions which are shown in FIG. 2*b* and the entire sheet 5 is immersed in the body of liquid 12. This results in commencement of electrophoretic development of latent image at the convex outer side of the sheet 5 on the sleeve 1*a*. The development is preferably initiated by relatively quick introduction of the sheet 5 into the body of liquid in the chamber 9. For example, the peripheral speed of the drum-shaped support 1 should preferably exceed five centimeters per second.

When the development of the sheet 5 in the liquid 12 is completed, the gears 2 and 3 are again caused to rotate the support 1 in the direction of arrow A so that the sheet 5, with a fully developed image thereon, emerges from the body of liquid and the liquid is caused to leave the chamber 9 and to accumulate in a second vessel or tank 13 (see FIG. 2*c*). It is preferred to rotate the support 1 in such a way that the speed at which the sheet 5 is introduced into the body of liquid 12 in the chamber 9 equals or approximates the speed at which the sheet 5 is moved from the position of FIG. 2*b* to the position which is shown in FIG. 2*c*. This insures that the time which is allotted for development of any selected portion of latent image on the sheet 5 is the same as that for the development of any other portion of such image.

When the liquid 12 (which contains toner particles) is evacuated from the chamber 9 (i.e., when such liquid is admitted into the tank 13), the electrode 5 is removed from the support 1 and the sheet 8 with the fully developed image thereon can be readily detached from the sleeve 1*a*, e.g., by interrupting the connection between the suction chamber or space 1*b* and the suction generating device. If desired, the sheet 5 can remain at the periphery of the support 1 subsequent to removal of the electrode 8. This enables the attendant or attendants to limit the thickness of the isododecanic layer by resorting to a positive corona discharge device, not shown. Also, such treatment can be followed by drying of the sheet 5 with heated air or in another suitable way and/or by any other treatment which is needed or desirable prior to examination of the fully developed image on the sheet 5.

It has been found that the quality of images on sheets 5 which are treated in the apparatus of FIGS. 1 and 2*a*–2*c* is surprisingly high. Thus, the images are free of streaks, strips, Schlieren effect or density fluctuations, i.e., the images are free of defects which are characteristic of many presently utilized developing techniques. The high quality of images is attributable, at least to a certain degree, to the fact that the body of liquid entering and flowing in the chamber 9 forms an almost ideal laminar flow. Such highly satisfactory laminar flow is attributable to the feature that the width of the chamber 9 (as considered in the radial direction of the support 1) is constant or nearly constant. Laminar flow of liquid takes place during admission of such liquid into the chamber 9, during rotation of the support 1 from the angular position of FIG. 2*a* to that which is shown in FIG. 2*b*, as well as during rotation of the support 1 from the position of FIG. 2*b* to the position of FIG. 2*c*. The establishment of a laminar flow insures that each and every portion of the image on the sheet 5 is contacted by the same quantity of toner particles which, in turn, insures that the quality of developed images is much more satisfactory than the quality of images which are developed in accordance with the heretofore known techniques.

The distancing rings 6 and 7 not only constitute a simple support for the electrode 8 but also furnish a highly satisfactory sealing action, i.e., they seal a portion of the chamber 9 from the surrounding atmosphere so that the developing agent 12 can enter or leave the chamber 9 only by flowing through the aperture 10. This reduces the likelihood of contamination of certain parts of the apparatus with developing agent. If desired, the electrode 8 can have several apertures, e.g., one for admission of liquid developing agent from the vessel 11 and one for introduction of spent liquid developing agent into the vessel 13.

In the apparatus of FIGS. 1 and 2*a*–2*c*, the width of the chamber 9 (when the electrode 8 is properly mounted on its support means 6, 7) is always constant.

FIGS. 3*a* through 3*f* illustrate schematically a fully automatic developing apparatus wherein the concavo-convex electrode 108 is rotatable with as well as relative to the rotary support 102 for electrostatically charged dielectric record carrier sheets 101. The support 102 constitutes a portion of a hollow drum and has a convex external surface 102*b* which is foraminous so that the internal space or suction chamber 102*d* of the support 102 can attract the concave inner side of an exposed but undeveloped sheet 101 during transport toward, through and beyond the developing station. The support 102 is mounted on and is rotatable about the axis of a horizontal shaft 103 which is installed in a suitable frame, not shown. The leading edge of the peripheral surface 102*b* (as considered in the direction of arrow B which denotes the direction of rotation of the support 102 from the position of FIG. 3*a*) is provided with a sheet-entraining projection or nose 102*a*. This projection can engage the folded-over leading edge 101*a* of an oncoming sheet 101 (compare FIGS. 3*a* and 3*b*).

The apparatus of FIGS. 3*a* to 3*f* further comprises a hollow second support 104 for the electrode 108. The support 104 has a developing chamber 110 and is rotatable with as well as relative to the support 102, either clockwise (arrow B) or counterclockwise (arrow C). The same holds true for the support 102. Furthermore, the supports 102 and 104 can turn back and forth as a unit (see the arrow D in FIG. 3*f*). The axis of rotation of the support 102 coincides with or is close to that of the support 104. In addition, the electrode 108 (with or without the entire support 104 therefor) can be moved, to a certain degree, radially of the shaft 103 (compare FIGS. 3*b* and 3*e*). For example, the means for moving the central portion of the support 104 (or the entire support 104) radially of the shaft 103, e.g., in response to rotation of the support 104 about the axis of the shaft 103 may comprise a follower 118 extending into the endless groove 117 of a cam 116 which surrounds the path for the support 104. A portion of the support 104 may consist of elastomeric material. Alternatively, the chamber 110 can be moved toward or away from the shaft 103 in response to rotation of the cam 116 about the support 104.

As shown in FIGS. 3*a* to 3*f*, the support 104 for the electrode 108 extends along an arc of approximately 180 degrees and is a hollow body including a central portion which defines the developing chamber 110 and two marginal portions which constitute compartments 105 and 106. The capacity of each of the two compartments 105, 106 equals or exceeds the capacity of the developing chamber 110, i.e., the liquid developing agent which is admitted into the interior of the support 104 can flow from the compartment 105 into the chamber 110 and from the chamber 110 into the compartment 106. The developing chamber 110 is outwardly adjacent to an aperture 107 which can be closed and sealed by a sheet 101 when the aperture 107 registers with the peripheral surface 102*b* of the support 102 and the marginal portions of a sheet 101 on the surface 102*b* are caused to bear against elastic sealing strips 107*a* (one shown in FIG. 3*a*) surrounding the aperture 107 at the concave inner side of the support 104. Thus, the dimensions of the aperture 107 approximate or are slightly less than the dimensions of the image-bearing outer side of a concavo-convex sheet 101 which adheres to the surface 102*b*. The cam 116 causes the follower 118 to move the chamber 110 toward the shaft 103 when the aperture 107 is to be sealed by a sheet 101 whereby the marginal portions of the sheet 101 engage and deform the adjacent sealing strips 107*a*. The electrode 108 faces the convex outer side of the sheet 101 when the latter seals the aperture 107 of the support 104. This electrode may consist of thin sheet metal, the same as the electrode 8 of the apparatus shown in FIGS. 1 and 2*a*–2*c*.

The sheet 101 may constitute a foil made of a synthetic plastic material, such as polyester. The manner in which such foil is deformed to provide the aforementioned leading edge 101*a* is disclosed, for example, in German Offenlegungsschrift No. 2,642,084. This sheet or foil is transported by a suitable conveyor system (not shown) from an electroradiographic imaging chamber to the position of FIG. 3*a* in which the leading edge 101*a* is located in the path of orbital movement of the projection 102*a*. Thus, when the support 102 is caused to rotate in a clockwise direction (arrow B), as viewed in FIG. 3*a*, its projection 102*a* automatically engages and entrains the sheet 101 whereby the sheet adheres to the peripheral surface 102*b* and assumes a concavo-convex shape because the suction chamber 102*d* communicates with a suitable suction generating device, not shown. At the same time, the support 104 for the electrode 108 is held in such position (shown in FIG. 3*a*) that the compartment 105 is located at a level below the developing chamber 110 and the latter is located at a level below the compartment 106. The provision of suction ports in the surface 102*b* insures that the sheet 101 lies flat against the exterior of the support 102.

The support 102 is thereupon rotated clockwise through 180 degrees so that it assumes the position which is shown in FIG. 3*b*. The reversible motor 114 which rotates the support 102 clockwise or counterclockwise is then arrested whereby the image-bearing convex outer side of the sheet 101 on the surface 102*b* is adjacent to the aperture 107 of the support 104. The support 102 can be arrested in a fully automatic way, e.g., by causing the projection 102*a* to enter a complementary socket or stop 109 at the inner side of the support 104 which is held against rotation in a clockwise direction. The follower 118 maintains the aperture 107 at a maximum distance from the shaft 103 when the support 104 assumes the angular position of FIG. 3*a* or 3*b*; this insures that the sheet 101 can readily move past the sealing strips 107*a*. The chamber 110 is thereupon moved toward the shaft 103 (e.g., by rotating the cam 116 relative to the support 104) so that the strips 107*a* sealingly engage the respective marginal portions of the sheet 101 on the support 102. In other words, the interior of the hollow support 104 is sealed from the surrounding atmosphere and the lower compartment 105 can receive liquid developing agent by way of an inlet 105*a*. The quantity of admitted agent (hereinafter called liquid) is such that the liquid does not contact the latent image at the outer side of the sheet 101 on the arrested support 102.

In the next step, the supports 102 and 104 are caused to rotate as a unit in the direction which is indicated by the arrow B so that the image-bearing outer side of the sheet 101 is fully immersed in the liquid (which then fills the chamber 110) as soon as the supports 102 and 104 assume the positions which are shown in FIG. 3*c*. This amounts to a rotation through an angle of approximately 90 degrees. Since the width of the chamber 110 (as considered in the radial direction of the shaft 103) is constant or nearly constant, the flow of liquid from the compartment 105 into the chamber 110 is substantially laminar. This brings about the advantages which were outlined in connection with the embodiment of FIGS. 1 and 2*a*–2*c*. The development of image on the sheet 101 begins as soon as the liquid contacts the sheet in the region of the aperture 107 (which is sealed between the marginal portions of the sheet 101 engage and deform the sealing strips 107*a*).

The development of image on the sheet 101 is completed as soon as the supports 102, 104 are moved to the positions which are illustrated in FIG. 3*d*, i.e., when the two supports are caused to turn clockwise through an angle of approximately 180 degrees. This causes the liquid to flow into the compartment 106. Such liquid can be evacuated from the interior of the support 104 by way of an outlet 106*a* which (the same as the inlet 105*a*) may constitute a flexible hose provided with a suitable valve, not specifically shown. The cam 116 is thereupon caused to move the chamber 110 away from the shaft 103 so that the marginal portions of the sheet 101 are disengaged from the respective sealing strips 107*a*. The sheet 101 continues to adhere to the surface 102*b* because the chamber 102*d* still communicates with the intake of the suction generating device.

In the next step, the supports 102 and 104 are again rotated through approximately 90 degrees (in a clockwise direction, as viewed in FIG. 3*d*) so that the support 104 reassumes the position shown in FIG. 3*a* or 3*b* (see FIG. 3*e*). The reversible motor 114 thereupon rotates the support 102 in a counterclockwise direction whereby the exposed and developed image on the sheet 101 travels past a corona discharge device 111 which limits the thickness of the isododecanic layer. The thus treated sheet 101 then moves past a suitable drying device 112, e.g., a conventional blower for hot air, which effects rapid drying of the developed image. The sheet 101 is then ready for detachment from the surface 102*b*, e.g., by interrupting the connection between the suction chamber 102*d* and the suction generating device. Detachment of a sheet 101 from the support 102 can be assisted by admitting compressed air or another gaseous fluid into the chamber 102*d* as soon as the drying operation is completed.

Prior to attaching the leading edge 101*a* of a fresh sheet 101 to the support 101, the apparatus of FIGS. 3*a* to 3*f* can be subjected to an aftertreatment which, as a rule, constitutes a cleaning of the support 104. As shown in FIG. 3*f*, the surface 102*b* can be overlapped by a flexible foil 113 which adheres to such surface owing to suction in the chamber 102*d*. The compartment 105 is filled with isododecane via inlet 105*a* while the support 104 assumes the position of FIG. 3*b*. The chamber 110 is thereupon moved toward the shaft 103 so that the strips 107*a* sealingly engage the foil 113 on the surface 102*b*, i.e., the aperture 107 is sealed before the supports 102, 104 move to the positions which are shown in FIG. 3*f*. The liquid then flows from the compartment 105 into the chamber 110 which is completely sealed from the surrounding atmosphere. In order to enhance the cleaning or rinsing action of liquid which fills a portion of the support 104, the supports 102 and 104 can be swung back and forth as indicated by the double-headed arrow D of FIG. 3*f*. Thus, the liquid can rinse the chamber 110 as well as the compartments 105 and 106. Once the rinsing action is completed, the supports 102, 104 are moved to the angular positions which are shown in FIG. 3*d*, and the isododecane is evacuated via outlet 106*a*. The reference character 115 denotes a reversible motor which can rotate the support 114 clockwise or counterclockwise. The foil 113 is removed before the aforementioned conveyor delivers a fresh sheet 101 which carries an exposed but undeveloped latent image.

It will be noted that the thickness of the compartments 105 and 106 (which respectively define storage areas for fresh and spent liquid developing agent) exceeds the thickness or width of the developing chamber 110, as considered in the radial direction of the supports 102 and 104. The electrode 108 is installed between the compartments 105, 106 and, when the aperture 107 is sealed by a sheet 101, the interior of the support 104 is completely sealed from the surrounding atmosphere so that the support 102 and/or other parts of the apparatus (with the exception of the interior of the support 104) cannot be contaminated by the liquid developing agent. If desired, the electrode 108 can extend along an arc of up to 180 degrees.

An important advantage of the apparatus of FIGS. 3*a* to 3*f* is that it can be used for a fully automated development of successive sheet-like carriers 101 of latent images. This is attributable (at least to a certain extent) to the fact that the carrier 101 on the support 102 can completely seal the interior of the support 104 from the surrounding atmosphere. Also, the developing agent can be readily transferred from the storage area which is defined by the compartment 105 into the chamber 110 or from the chamber 110 into the storage area which is defined by the compartment 106 by the simple expedient of rotating the supports 102 and 104 in one and the same direction, i.e., in the direction which is indicated by the arrow B. The compartment 105 is located at a level below the compartment 106 and below the chamber 110 when the inlet 105*a* admits fresh developing agent, the chamber 110 is located at a level below the compartments 105, 106 when the entire image on the sheet-like carrier 101 is contacted by developing agent, and the compartment 106 is located at a level below the compartment 105 and below the chamber 110 when the development of image on the carrier 101 which seals the aperture 107 is terminated.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for electrophoretically developing electrostatically charged sheet-like members which constitute carriers of latent images, especially radiograhic images, by contact with a liquid developing agent for a given interval of time, comprising first rotary support means arranged to impart to a sheet-like member a concavo-convex configuration so that the latent image is located at one side of the sheet-like member; a concavo-convex electrode member; second rotary support means substantially coaxial with said first support means and arranged to support said electrode member so that one side of said electrode member faces said one side of said concavo-convex sheet-like member when said members are located opposite each other whereby said sides of said members define a developing chamber of substantially constant width; means for admitting liquid developing agent to said chamber; means for rotating at least one of said support means in a predetermined direction to thereby place said one side of the sheet-like member on said first support means into contact with the developing agent in said chamber; and means for interrupting such contact, including means for rotating at least one of said support means in said direction.

2. The apparatus of claim 1, wherein said first support means constitutes at least a portion of a rotary drum having a cylindrical peripheral surface for the other side of the sheet-like member.

3. The apparatus of claim 2, further comprising means for at least partially sealing said chamber from the atmosphere, at least while said members are located opposite each other.

4. The apparatus of claim 3, wherein said sealing means forms part of said second support means.

5. The apparatus of claim 2, wherein said admitting means includes a first vessel and further comprising a second vessel for reception of developing agent from said chamber.

6. The apparatus of claim 5, wherein said first support means is a rotary drum having a circumferentially complete shell and said second support means includes two distancing rings surrounding said shell, said electrode having an aperture for admission of developing agent which is dispensed from said first vessel in a first angular position of said drum and for transfer of developing agent into said second vessel in a second angular position of said drum.

7. The apparatus of claim 5, wherein said vessels are compartments in said second support means, said electrode member being disposed between said compartments.

8. The apparatus of claim 7, wherein said second support means is hollow and includes a central portion constituting said chamber, a first end portion constituting one of said compartments, and a second end portion constituting the other of said compartments.

9. The apparatus of claim 8, wherein said second support means has a concave side facing said first support means and an aperture in said concave side, one of said support means being movable radially toward and away from the other support means so as to seal said aperture by the sheet-like member on said first support means when the sheet-like member registers with said aperture and said one support means is moved toward the other support means.

10. The apparatus of claim 9, wherein said chamber is outwardly adjacent to said aperture and has a constant width, as considered in the radial direction of said support means.

11. The apparatus of claim 7, wherein the width of said compartments, as considered radially of said support means, exceeds the width of said chamber.

12. The apparatus of claim 11, wherein said second support means extends along an arc of approximately 180 degrees.

* * * * *